US010020008B2

(12) United States Patent
Dai et al.

(10) Patent No.: US 10,020,008 B2
(45) Date of Patent: Jul. 10, 2018

(54) MICROPHONE AND CORRESPONDING DIGITAL INTERFACE

(71) Applicant: Knowles Electronics, LLC, Itasca, IL (US)

(72) Inventors: Weiwen Dai, Elgin, IL (US); Robert A. Popper, Lemont, IL (US)

(73) Assignee: Knowles Electronics, LLC, Itasca, IL (US)

( * ) Notice: Subject to any disclaimer, the term of this patent is extended or adjusted under 35 U.S.C. 154(b) by 0 days.

(21) Appl. No.: 14/533,652

(22) Filed: Nov. 5, 2014

(65) Prior Publication Data

US 2015/0058001 A1 Feb. 26, 2015

Related U.S. Application Data

(63) Continuation-in-part of application No. 14/282,101, filed on May 20, 2014.

(60) Provisional application No. 61/901,832, filed on Nov. 8, 2013, provisional application No. 61/826,587, filed on May 23, 2013.

(51) Int. Cl.

| | |
|---|---|
| ***G06F 17/00*** | (2006.01) |
| ***G10L 25/78*** | (2013.01) |
| ***H04R 3/00*** | (2006.01) |

(52) U.S. Cl.

CPC ................ *G10L 25/78* (2013.01); *H04R 3/00* (2013.01); *H04R 2410/00* (2013.01); *H04R 2499/11* (2013.01)

(58) Field of Classification Search

CPC ... G10L 15/00; G10L 25/78; G10L 2025/783; G10L 25/81; G10L 25/84; G10L 25/87; G10L 25/90; G10L 2025/903; G10L 2025/906; G10L 2025/932; G10L 2025/935; G10L 2025/937; G10L 2025/786; H04R 19/005; H04R 19/04

USPC ........................ 700/94; 381/111, 7; 704/208; 455/556.1

See application file for complete search history.

(56) References Cited

U.S. PATENT DOCUMENTS

| | | | |
|---|---|---|---|
| 4,052,568 | A | 10/1977 | Jankowski |
| 4,831,558 | A | 5/1989 | Shoup et al. |
| 5,555,287 | A | 9/1996 | Gulick et al. |

(Continued)

FOREIGN PATENT DOCUMENTS

| | | | |
|---|---|---|---|
| CN | 1083639 | A | 3/1994 |
| JP | 2001236095 | A | 8/2001 |

(Continued)

OTHER PUBLICATIONS

PCT Search Report for PCT/US2014/038790, dated Sep. 24, 2014, 9 pages.

(Continued)

*Primary Examiner* — Md S Elahee

(74) *Attorney, Agent, or Firm* — Foley & Lardner LLP

(57) ABSTRACT

Analog signals are received from a sound transducer. The analog signals are converted into digitized data. A determination is made as to whether voice activity exists within the digitized signal. Upon the detection of voice activity, an indication of voice activity is sent to a processing device. The indication is sent across a standard interface, and the standard interface is configured to be compatible to be coupled with a plurality of devices from potentially different manufacturers.

22 Claims, 6 Drawing Sheets

(56) References Cited

U.S. PATENT DOCUMENTS 5,577,164 A 11/1996 Kaneko
5,598,447 A 1/1997 Usui
5,675,808 A 10/1997 Gulick
5,822,598 A 10/1998 Lam
5,983,186 A 11/1999 Miyazawa
6,049,565 A 4/2000 Paradine et al.
6,057,791 A 5/2000 Knapp
6,070,140 A 5/2000 Tran
6,154,721 A 11/2000 Sonnic
6,249,757 B1 6/2001 Cason
6,259,291 B1 7/2001 Huang
6,282,268 B1 * 8/2001 Hughes ................ H04M 3/493 379/88.02
6,324,514 B2 11/2001 Matulich
6,397,186 B1 5/2002 Bush
6,453,020 B1 9/2002 Hughes
6,564,330 B1 5/2003 Martinez
6,591,234 B1 7/2003 Chandran
6,640,208 B1 10/2003 Zhang
6,756,700 B2 6/2004 Zeng
6,829,244 B1 12/2004 Wildfeuer et al.
7,190,038 B2 3/2007 Dehe
7,415,416 B2 8/2008 Rees
7,473,572 B2 1/2009 Dehe
7,619,551 B1 11/2009 Wu
7,630,504 B2 12/2009 Poulsen
7,774,202 B2 8/2010 Spengler
7,774,204 B2 8/2010 Mozer
7,781,249 B2 8/2010 Laming
7,795,695 B2 9/2010 Weigold
7,825,484 B2 11/2010 Martin
7,829,961 B2 11/2010 Hsiao
7,856,283 B2 12/2010 Burk
7,856,804 B2 12/2010 Laming
7,903,831 B2 3/2011 Song
7,936,293 B2 5/2011 Hamashita
7,941,313 B2 5/2011 Garudadri et al.
7,957,972 B2 6/2011 Huang
7,994,947 B1 8/2011 Ledzius
8,171,322 B2 5/2012 Fiennes
8,208,621 B1 6/2012 Hsu
8,275,148 B2 9/2012 Li
8,331,581 B2 12/2012 Pennock
8,666,751 B2 3/2014 Murthi
8,687,823 B2 4/2014 Loeppert
8,731,210 B2 5/2014 Cheng
8,798,289 B1 8/2014 Every
8,804,974 B1 8/2014 Melanson
8,849,231 B1 9/2014 Murgia
8,972,252 B2 3/2015 Hung
8,996,381 B2 3/2015 Mozer
9,020,819 B2 4/2015 Saitoh
9,043,211 B2 5/2015 Haiut
9,059,630 B2 6/2015 Gueorguiev
9,073,747 B2 7/2015 Ye
9,076,447 B2 7/2015 Nandy
9,111,548 B2 8/2015 Nandy
9,112,984 B2 8/2015 Sejnoha
9,113,263 B2 8/2015 Furst
9,119,150 B1 8/2015 Murgia
9,142,215 B2 9/2015 Rosner
9,147,397 B2 9/2015 Thomsen
9,161,112 B2 10/2015 Ye
2002/0054588 A1 5/2002 Mehta
2002/0116186 A1 8/2002 Strauss
2002/0123893 A1 9/2002 Woodward
2002/0184015 A1 12/2002 Li
2003/0004720 A1 1/2003 Garudadri et al.
2003/0061036 A1 * 3/2003 Garudadri et al. ........... 704/208
2003/0138061 A1 * 7/2003 Li ........................... H04B 3/23 375/326
2003/0144844 A1 7/2003 Colmenarez
2003/0171907 A1 * 9/2003 Gal-On .............. G06F 17/5022 703/14
2004/0022379 A1 * 2/2004 Klos et al. ............... 379/201.01
2005/0207605 A1 9/2005 Dehe
2006/0013415 A1 1/2006 Winchester
2006/0074658 A1 4/2006 Chadha
2006/0233389 A1 10/2006 Mao et al.
2006/0247923 A1 11/2006 Chandran
2007/0127761 A1 6/2007 Poulsen
2007/0168908 A1 7/2007 Paolucci
2007/0274297 A1 11/2007 Cross et al.
2007/0278501 A1 12/2007 MacPherson
2008/0089536 A1 4/2008 Josesson
2008/0175425 A1 7/2008 Roberts
2008/0201138 A1 8/2008 Visser
2008/0267431 A1 10/2008 Leidl
2008/0279407 A1 11/2008 Pahl
2008/0283942 A1 11/2008 Huang
2009/0001553 A1 1/2009 Pahl
2009/0003629 A1 1/2009 Shajaan et al.
2009/0180655 A1 7/2009 Tien
2009/0234645 A1 9/2009 Bruhn
2010/0046780 A1 2/2010 Song
2010/0052082 A1 3/2010 Lee
2010/0057474 A1 3/2010 Kong
2010/0128894 A1 5/2010 Petit
2010/0128914 A1 5/2010 Khenkin
2010/0131783 A1 5/2010 Weng
2010/0183181 A1 7/2010 Wang
2010/0246877 A1 9/2010 Wang
2010/0290644 A1 11/2010 Wu
2010/0292987 A1 11/2010 Kawaguchi
2010/0322443 A1 12/2010 Wu
2010/0322451 A1 12/2010 Wu
2011/0007907 A1 1/2011 Park
2011/0013787 A1 1/2011 Chang
2011/0029109 A1 2/2011 Thomsen
2011/0075875 A1 3/2011 Wu
2011/0106533 A1 5/2011 Yu
2011/0208520 A1 8/2011 Lee
2011/0280109 A1 11/2011 Raymond
2012/0010890 A1 1/2012 Koverzin
2012/0112804 A1 5/2012 Li et al.
2012/0232896 A1 9/2012 Taleb
2012/0250881 A1 10/2012 Mulligan
2012/0250910 A1 10/2012 Shajaan et al.
2012/0310641 A1 12/2012 Niemisto
2013/0035777 A1 2/2013 Niemisto et al.
2013/0044898 A1 2/2013 Schultz
2013/0058495 A1 3/2013 Furst et al.
2013/0058506 A1 3/2013 Boor
2013/0223635 A1 8/2013 Singer
2013/0226324 A1 8/2013 Hannuksela
2013/0246071 A1 9/2013 Lee
2013/0322461 A1 12/2013 Poulsen
2013/0343584 A1 * 12/2013 Bennett ................ H04R 25/554 381/315
2014/0064523 A1 3/2014 Kropfitsch
2014/0122078 A1 5/2014 Joshi
2014/0143545 A1 * 5/2014 McKeeman et al. ......... 713/168
2014/0163978 A1 6/2014 Basye
2014/0177113 A1 6/2014 Gueorguiev
2014/0188467 A1 7/2014 Jing
2014/0188470 A1 7/2014 Chang
2014/0197887 A1 7/2014 Hovesten
2014/0244269 A1 8/2014 Tokutake
2014/0244273 A1 8/2014 Laroche et al.
2014/0249820 A1 9/2014 Hsu
2014/0257813 A1 9/2014 Mortensen
2014/0257821 A1 9/2014 Adams
2014/0270260 A1 * 9/2014 Goertz .................... G10L 25/84 381/110
2014/0274203 A1 * 9/2014 Ganong, III ...... H04W 52/0251 455/556.1
2014/0278435 A1 * 9/2014 Ganong, III ............ G10L 15/22 704/275
2014/0281628 A1 9/2014 Nigam
2014/0343949 A1 11/2014 Huang
2014/0348345 A1 11/2014 Furst
2014/0358552 A1 12/2014 Xu
2015/0039303 A1 2/2015 Lesso
2015/0043755 A1 2/2015 Furst

(56) References Cited

U.S. PATENT DOCUMENTS

| | | | |
|---|---|---|---|
| 2015/0046157 | A1 | 2/2015 | Wolff |
| 2015/0046162 | A1 | 2/2015 | Aley-Raz |
| 2015/0049884 | A1 | 2/2015 | Ye |
| 2015/0055803 | A1 | 2/2015 | Qutub |
| 2015/0058001 | A1 | 2/2015 | Dai |
| 2015/0063594 | A1 | 3/2015 | Nielsen |
| 2015/0073780 | A1 | 3/2015 | Sharma |
| 2015/0073785 | A1 | 3/2015 | Sharma |
| 2015/0088500 | A1 | 3/2015 | Conliffe |
| 2015/0106085 | A1 | 4/2015 | Lindahl |
| 2015/0110290 | A1 | 4/2015 | Furst |
| 2015/0112690 | A1 | 4/2015 | Guha |
| 2015/0134331 | A1 | 5/2015 | Millet |
| 2015/0154981 | A1 | 6/2015 | Barreda |
| 2015/0161989 | A1 | 6/2015 | Hsu |
| 2015/0195656 | A1 | 7/2015 | Ye |
| 2015/0206527 | A1 | 7/2015 | Connolly |
| 2015/0256660 | A1 | 9/2015 | Kaller |
| 2015/0256916 | A1 | 9/2015 | Volk |
| 2015/0287401 | A1 | 10/2015 | Lee |
| 2015/0302865 | A1 | 10/2015 | Pilli |
| 2015/0304502 | A1 | 10/2015 | Pilli |
| 2015/0350760 | A1 | 12/2015 | Nandy |
| 2015/0350774 | A1 | 12/2015 | Furst |
| 2016/0012007 | A1 | 1/2016 | Popper |
| 2016/0087596 | A1 | 3/2016 | Yurrtas |
| 2016/0133271 | A1 | 5/2016 | Kuntzman |
| 2016/0134975 | A1 | 5/2016 | Kuntzman |

FOREIGN PATENT DOCUMENTS

| | | | |
|---|---|---|---|
| JP | 2004219728 | | 8/2004 |
| WO | WO-02/03747 | A2 | 1/2002 |
| WO | 2009130591 | | 10/2009 |
| WO | 2011106065 | A1 | 9/2011 |
| WO | 2011140096 | | 11/2011 |
| WO | 2013049358 | | 4/2013 |
| WO | 2013085499 | | 6/2013 |

OTHER PUBLICATIONS

PCT Search Report PCT/US2014/064324, dated Feb. 12, 2015, 13 pages.

"MEMS technologies: Microphone" EE Herald Jun. 20, 2013.

Delta-sigma modulation, Wikipedia (Jul. 4, 2013).

Pulse-density modulation, Wikipedia (May 3, 2013).

Kite, Understanding PDM Digital Audio, Audio Precision, Beaverton, OR, 2012.

International Search Report and Written Opinion for PCT/US2014/060567 dated Jan. 16, 2015 (12 pages).

International Search Report and Written Opinion for PCT/US2014/062861 dated Jan. 23, 2015 (12 pages).

U.S. Appl. No. 14/285,585, dated May 22, 2014, Santos.

U.S. Appl. No. 14/495,482, dated Sep. 24, 2014, Murgia.

U.S. Appl. No. 14/522,264, dated Oct. 23, 2014, Murgia.

U.S. Appl. No. 14/698,652, dated Apr. 28, 2015, Yapanel.

U.S. Appl. No. 14/749,425, dated Jun. 24, 2015, Verma.

U.S. Appl. No. 14/853,947, dated Sep. 14, 2015, Yen.

U.S. Appl. No. 62/100,758, dated Jan. 7, 2015, Rossum.

International Search Report and Written Opinion for PCT/US2016/013859 dated Apr. 29, 2016 (12 pages).

Search Report of Taiwan Patent Application No. 103135811, dated Apr. 18, 2016 (1 page).

* cited by examiner

| Transition | Requirements | Transition | Requirements |
|---|---|---|---|
| A1 | Apply Vdd<br>No clock on clock input pin | A1' | Remove Vdd |
| A2 | Apply Vdd<br>Apply 512kHz clock to clock imput pin | A2' | Remove Vdd |
| B1 | Acoustic Event Trigger | B1' | No Acoustic Activity for OTP programmed amount of time |
| B2 | Acoustic Event Trigger | B2' | No Acoustic Activity for OTP programmed amount of time |
| C | NO PATH IN THIS DIRECTION, BUFFER IS NOT VALID<br>MUST Go through E1' or E2' | C' | Clock Detected on Clock Pin > 1MHz |
| D | Remove Vdd | D' | Apply Vdd<br>Clock Input > 1MHz |
| E1 | Clock Detected > 1MHz | E1' | No Clock on Clock pin |
| E2 | Clock Detected > 1MHz | E2' | Clock Detected at 512kHz |
| E3 | Clock Detected at 512kHz | E3' | No Clock on Clock pin |

*FIG. 5*

MICROPHONE AND CORRESPONDING DIGITAL INTERFACE

CROSS REFERENCE TO RELATED APPLICATION

This patent claims benefit under 35 U.S.C. § 119(e) to U.S. Provisional Application No. 61/901,832 entitled "Microphone and Corresponding Digital Interface" filed Nov. 8, 2013, the content of which is incorporated herein by reference in its entirety. This patent is a continuation-in-part of U.S. application Ser. No. 14/282,101 entitled "VAD Detection Microphone and Method of Operating the Same" filed May 20, 2014, which claims priority to U.S. Provisional Application No. 61/826,587 entitled "VAD Detection Microphone and Method of Operating the Same" filed May 23, 2013, the content of both is incorporated by reference in its entirety.

TECHNICAL FIELD

This application relates to acoustic activity detection (AAD) approaches and voice activity detection (VAD) approaches, and their interfacing with other types of electronic devices.

BACKGROUND OF THE INVENTION

Voice activity detection (VAD) approaches are important components of speech recognition software and hardware. For example, recognition software constantly scans the audio signal of a microphone searching for voice activity, usually, with a MIPS intensive algorithm. Since the algorithm is constantly running, the power used in this voice detection approach is significant.

Microphones are also disposed in mobile device products such as cellular phones. These customer devices have a standardized interface. If the microphone is not compatible with this interface it cannot be used with the mobile device product.

Many mobile devices products have speech recognition included with the mobile device. However, the power usage of the algorithms are taxing enough to the battery that the feature is often enabled only after the user presses a button or wakes up the device. In order to enable this feature at all times, the power consumption of the overall solution must be small enough to have minimal impact on the total battery life of the device. As mentioned, this has not occurred with existing devices.

Because of the above-mentioned problems, some user dissatisfaction with previous approaches has occurred.

BRIEF DESCRIPTION OF THE DRAWINGS

For a more complete understanding of the disclosure, reference should be made to the following detailed description and accompanying drawings wherein:

FIG. 5 comprises a table showing the conditions for transitions between the states shown in the state diagram of FIG. 4 according to various embodiments of the present invention.

Figure 1A:
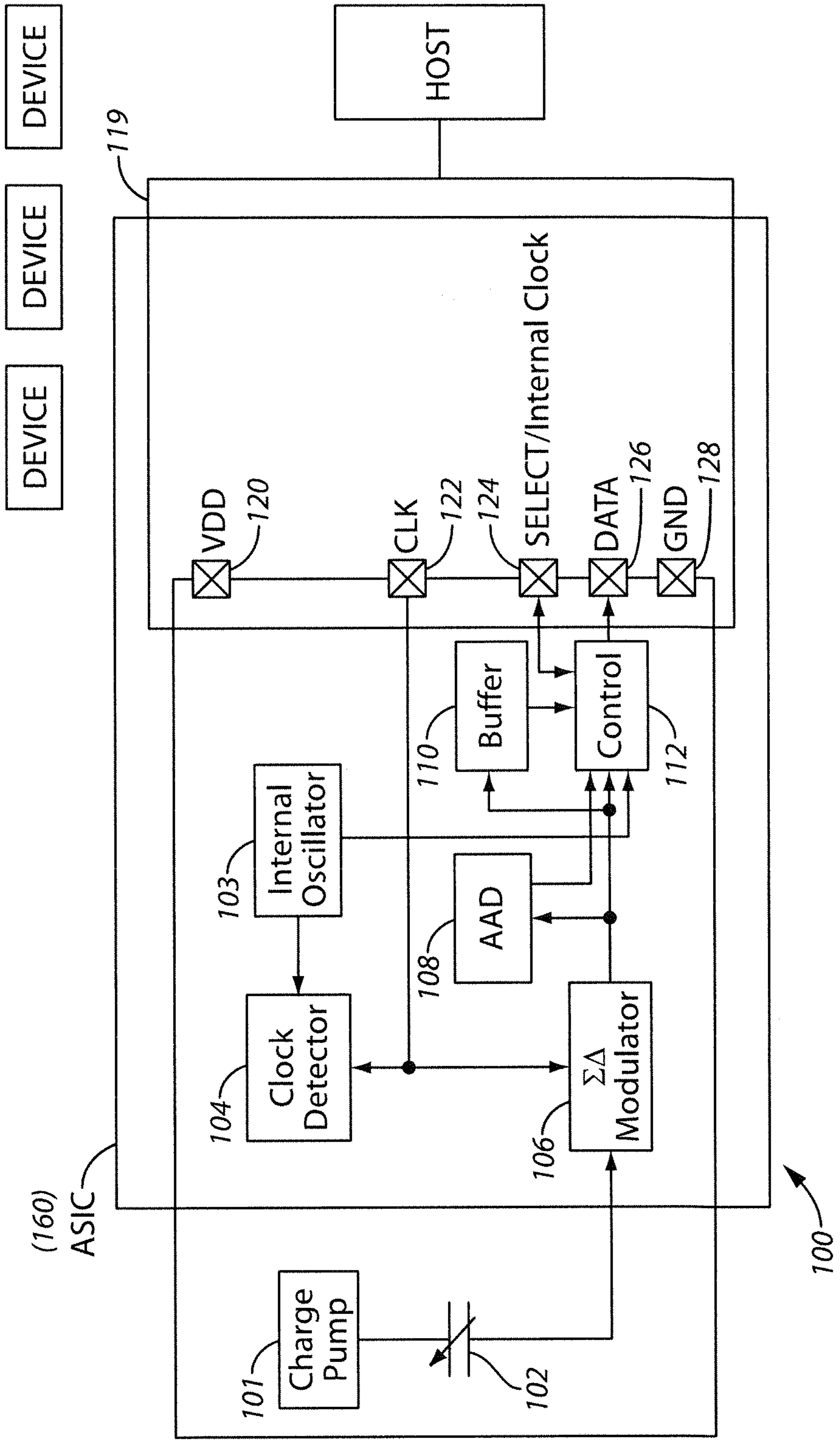
FIG. 1A comprises a block diagram of an acoustic system with acoustic activity detection (AAD) according to various embodiments of the present invention.

Skilled artisans will appreciate that elements in the figures are illustrated for simplicity and clarity. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION

Approaches are described herein that integrate voice activity detection (VAD) or acoustic activity detection (AAD) approaches into microphones. At least some of the microphone components (e.g., VAD or AAD modules) are disposed at or on an application specific circuit (ASIC) or other integrated device. The integration of components such as the VAD or AAD modules significantly reduces the power requirements of the system thereby increasing user satisfaction with the system. An interface is also provided between the microphone and circuitry in an electronic device (e.g., cellular phone or personal computer) in which the microphone is disposed. The interface is standardized so that its configuration allows placement of the microphone in most if not all electronic devices (e.g. cellular phones). The microphone operates in multiple modes of operation including a lower power mode that still detects acoustic events such as voice signals.

In many of these embodiments, at a microphone analog signals are received from a sound transducer. The analog signals are converted into digitized data. A determination is made as to whether voice activity exists within the digitized signal. Upon the detection of voice activity, an indication of voice activity is sent to a processing device. The indication is sent across a standard interface, and the standard interface configured to be compatible to be coupled with a plurality of devices from potentially different manufacturers.

In other aspects, the microphone is operated in multiple operating modes, such that the microphone selectively operate in and moves between a first microphone sensing mode and a second microphone sensing mode based upon one of more of whether an external clock is being received from a processing device, or whether power is being supplied to the microphone. Within the first microphone sensing mode, the microphone utilizes an internal clock, receives first analog signals from a sound transducer, converts the first analog signals into first digitized data, determines whether voice activity exists within the first digitized signal, and upon the detection of voice activity, sends an indication of voice activity to the processing device an subsequently switches from using the internal clock and receives an external clock. Within the second microphone sensing mode, the microphone receives second analog signals from a sound transducer, converts the second analog signals into second digitized data, determines whether voice activity exists within the second digitized signal, and upon the detection of voice activity, sends an indication of voice activity to the processing device, and uses the external clock supplied by the processing device.

In some examples, the indication comprises a signal indicating voice activity has been detected or a digitized signal. In other examples, the transducer comprises one of a microelectromechanical system (MEMS) device, a piezoelectric device, or a speaker.

In some aspects, the receiving, converting, determining, and sending are performed at an integrated circuit. In other aspects, the integrated circuit is disposed at one of a cellular phone, a smart phone, a personal computer, a wearable electronic device, or a tablet. In some examples, the receiving, converting, determining, and sending are performed when operating in a single mode of operation.

In some examples, the single mode is a power saving mode. In other examples, the digitized data comprises PDM data or PCM data. In some other examples, the indication comprises a clock signal. In yet other examples, the indication comprises one or more DC voltage levels.

In some examples, subsequent to sending the indication, a clock signal is received at the microphone. In some aspects, the clock signal is utilized to synchronize data movement between the microphone and an external processor. In other examples, a first frequency of the received clock is the same as a second frequency of an internal clock disposed at the microphone. In still other examples, a first frequency of the received clock is different than a second frequency of an internal clock disposed at the microphone.

In some examples, prior to receiving clock, the microphone is in a first mode of operation, and receiving the clock is effective to cause the microphone to enter a second mode of operation. In other examples, the standard interface is compatible with any combination of the PDM protocol, the $I^2S$ protocol, or the $I^2C$ protocol.

In others of these embodiments, an apparatus includes an analog-to-digital conversion circuit, the analog-to-digital conversion circuit being configured to receive analog signals from a sound transducer and convert the analog signals into digitized data. The apparatus also includes a standard interface and a processing device. The processing device is coupled to the analog-to-digital conversion circuit and the standard interface. The processing device is configured to determine whether voice activity exists within the digitized signal and upon the detection of voice activity, to send an indication of voice activity to an external processing device. The indication is sent across the standard interface, and the standard interface configured to be compatible to be coupled with a plurality of devices from potentially different manufacturers.

Referring now to FIG. 1A, a microphone apparatus 100 includes a charge pump 101, a capacitive microelectromechanical system (MEMS) sensor 102, a clock detector 104, a sigma-delta modulator 106, an acoustic activity detection (AAD) module 108, a buffer 110, and a control module 112. It will be appreciated that these elements may be implemented as various combinations of hardware and programmed software and at least some of these components can be disposed on an ASIC.

The charge pump 101 provides a voltage to charge up and bias a diaphragm of the capacitive MEMS sensor 102. For some applications (e.g., when using a piezoelectric device as a sensor), the charge pump may be replaced with a power supply that may be external to the microphone. A voice or other acoustic signal moves the diaphragm, the capacitance of the capacitive MEMS sensor 102 changes, and voltages are created that becomes an electrical signal. In one aspect, the charge pump 101 and the MEMS sensor 102 are not disposed on the ASIC (but in other aspects, they may be disposed on the ASIC). It will be appreciated that the MEMS sensor 102 may alternatively be a piezoelectric sensor, a speaker, or any other type of sensing device or arrangement.

The clock detector 104 controls which clock goes to the sigma-delta modulator 106 and synchronizes the digital section of the ASIC. If external clock is present, the clock detector 104 uses that clock; if no external clock signal is present, then the clock detector 104 use an internal oscillator 103 for data timing/clocking purposes.

The sigma-delta modulator 106 converts the analog signal into a digital signal. The output of the sigma-delta modulator 106 is a one-bit serial stream, in one aspect. Alternatively, the sigma-delta modulator 106 may be any type of analog-to-digital converter.

The buffer 110 stores data and constitutes a running storage of past data. By the time acoustic activity is detected, this past additional data is stored in the buffer 110. In other words, the buffer 110 stores a history of past audio activity. When an audio event happens (e.g., a trigger word is detected), the control module 112 instructs the buffer 110 to spool out data from the buffer 110. In one example, the buffer 110 stores the previous approximately 180 ms of data generated prior to the activity detect. Once the activity has been detected, the microphone 100 transmits the buffered data to the host (e.g., electronic circuitry in a customer device such as a cellular phone).

The acoustic activity detection (AAD) module 108 detects acoustic activity. Various approaches can be used to detect such events as the occurrence of a trigger word, trigger phrase, specific noise or sound, and so forth. In one aspect, the module 108 monitors the incoming acoustic signals looking for a voice-like signature (or monitors for other appropriate characteristics or thresholds). Upon detection of acoustic activity that meets the trigger requirements, the microphone 100 transmits a pulse density modulation (PDM) stream to wake up the rest of the system chain to complete the full voice recognition process. Other types of data could also be used.

The control module 112 controls when the data is transmitted from the buffer. As discussed elsewhere herein, when activity has been detected by the AAD module 108, then the data is clocked out over an interface 119 that includes a VDD pin 120, a clock pin 122, a select pin 124, a data pin 126 and a ground pin 128. The pins 120-128 form the interface 119 that is recognizable and compatible in operation with various types of electronic circuits, for example, those types of circuits that are used in cellular phones. In one aspect, the microphone 100 uses the interface 119 to communicate with circuitry inside a cellular phone. Since the interface 119 is standardized as between cellular phones, the microphone 100 can be placed or disposed in any phone that utilizes the standard interface. The interface 119 seamlessly connects to compatible circuitry in the cellular phone. Other interfaces are possible with other pin outs. Different pins could also be used for interrupts.

In operation, the microphone 100 operates in a variety of different modes and several states that cover these modes. For instance, when a clock signal (with a frequency falling within a predetermined range) is supplied to the microphone 100, the microphone 100 is operated in a standard operating mode. If the frequency is not within that range, the microphone 100 is operated within a sensing mode. In the sensing mode, the internal oscillator 103 of the microphone 100 is being used and, upon detection of an acoustic event, data transmissions are aligned with the rising clock edge, where the clock is the internal clock.

Figure 1B:
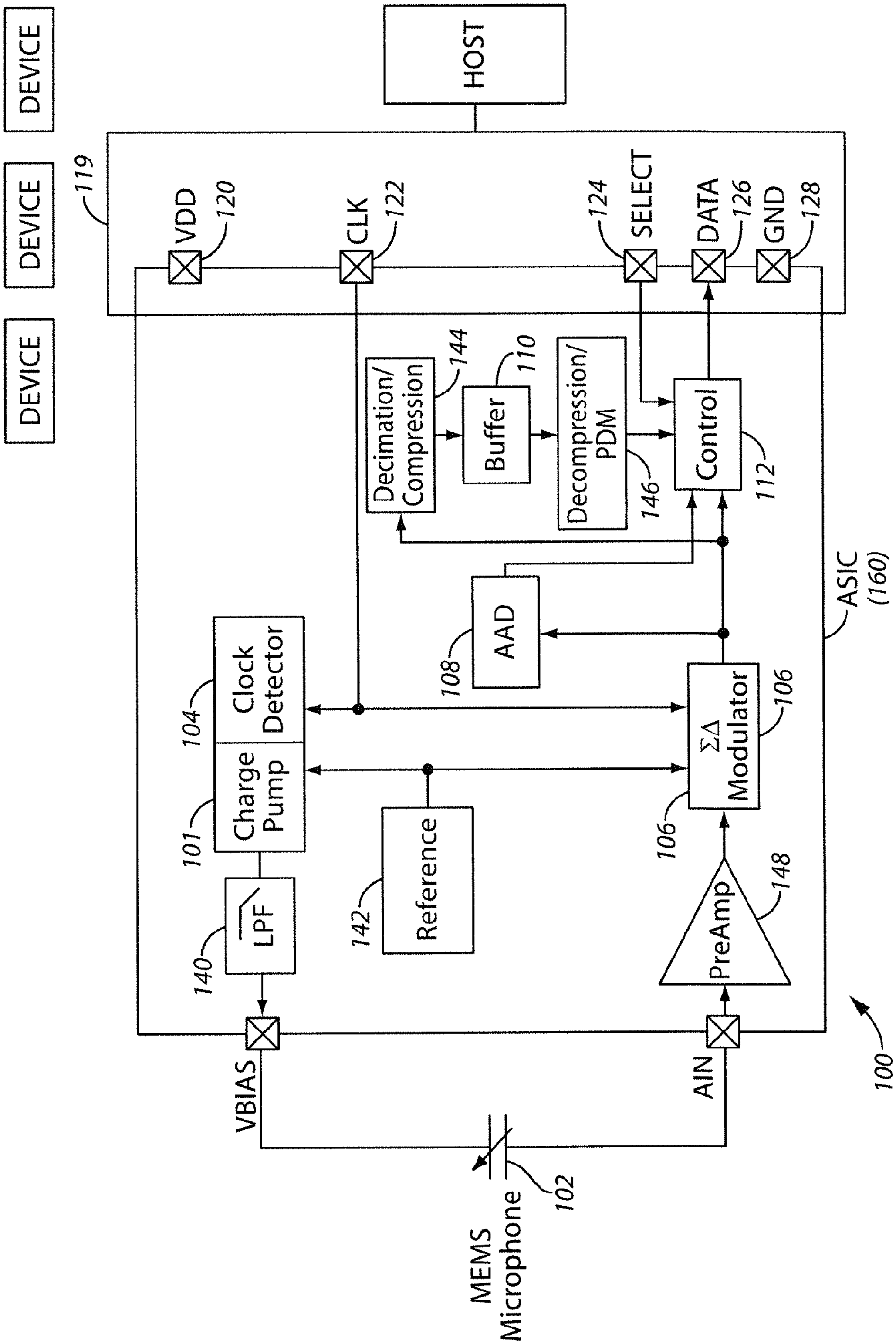
FIG. 1B comprises a block diagram of another acoustic system with acoustic activity detection (AAD) according to various embodiments of the present invention.

Referring now to FIG. 1B, another example of a microphone 100 is described. This example includes the same elements as those shown in FIG. 1A and these elements are numbered using the same labels as those shown in FIG. 1A.

In addition, the microphone 100 of FIG. 1B includes a low pass filter 140, a reference 142, a decimation/compression module 144, a decompression PDM module 146, and a pre-amplifier 148.

The function of the low pass filter 140 removes higher frequency from the charge pump. The function of the reference 142 is a voltage or other reference used by components within the system as a convenient reference value. The function of the decimation/compression module 144 is to minimize the buffer size take the data or compress and then store it. The function of the decompression PDM module 146 is pulls the data apart for the control module. The function of the pre-amplifier 148 is bringing the sensor output signal to a usable voltage level.

The components identified by the label 100 in FIG. 1A and FIG. 1B may be disposed on a single application specific integrated circuit (ASIC) or other integrated device. However, the charge pump 101 is not disposed on the ASIC 160 in FIG. 1A and is on the ASIC in the system of FIG. 1B. These elements may or may not be disposed on the ASIC in a particular implementation. It will be appreciated that the ASIC may have other functions such as signal processing functions.

Referring now to FIG. 2, FIG. 3, FIG. 4, and FIG. 5, a microphone (e.g., the microphone 100 of FIG. 1) operates in a standard performance mode and a sensing mode, and these are determined by the clock frequency. In standard performance mode, the microphone acts as a standard microphone in which it clocks out data as received. The frequency range required to cause the microphone to operate in the standard mode may be defined or specified in the datasheet for the part-in-question or otherwise supplied by the manufacturer of the microphone.

In sensing mode, the output of the microphone is tri-stated and an internal clock is applied to the sensing circuit. Once the AAD module triggers (e.g., sends a trigger signal indicating an acoustic event has occurred), the microphone transmits buffered PDM data on the microphone data pin (e.g., data pin 126) synchronized with the internal clock (e.g. a 512 kHz clock). This internal clock will be supplied to the select pin (e.g., select pin 124) as an output during this mode. In this mode, the data will be valid on the rising edge of the internally generated clock (output on the select pin). This operation assures compatibility with existing I2S-compatible hardware blocks. The clock pin (e.g., clock pin 122) and the data pin (e.g., data pin 126) will stop outputting data a set time after activity is no longer detected. The frequency for this mode is defined in the datasheet for the part in question. In other example, the interface is compatible with the PDM protocol or the $I^2C$ protocol. Other examples are possible.

The operation of the microphone described above is shown in FIG. 2. The select pin (e.g., select pin 124) is the top line, the data pin (e.g., data pin 126) is the second line from the top, and the clock pin (e.g., clock pin 122) is the bottom line on the graph. It can be seen that once acoustic activity is detected, data is transmitted on the rising edge of the internal clock. As mentioned, this operation assures compatibility with existing I2S-compatible hardware blocks.

For compatibility to the DMIC-compliant interfaces in sensing mode, the clock pin (e.g., clock pin 122) can be driven to clock out the microphone data. The clock must meet the sensing mode requirements for frequency (e.g., 512 kHz). When an external clock signal is detected on the clock pin (e.g., clock pin 122), the data driven on the data pin (e.g., data pin 126) is synchronized with the external clock within two cycles, in one example. Other examples are possible. In this mode, the external clock is removed when activity is no longer detected for the microphone to return to lowest power mode. Activity detection in this mode may use the select pin (e.g., select pin 124) to determine if activity is no longer sensed. Other pins may also be used.

Figure 3:
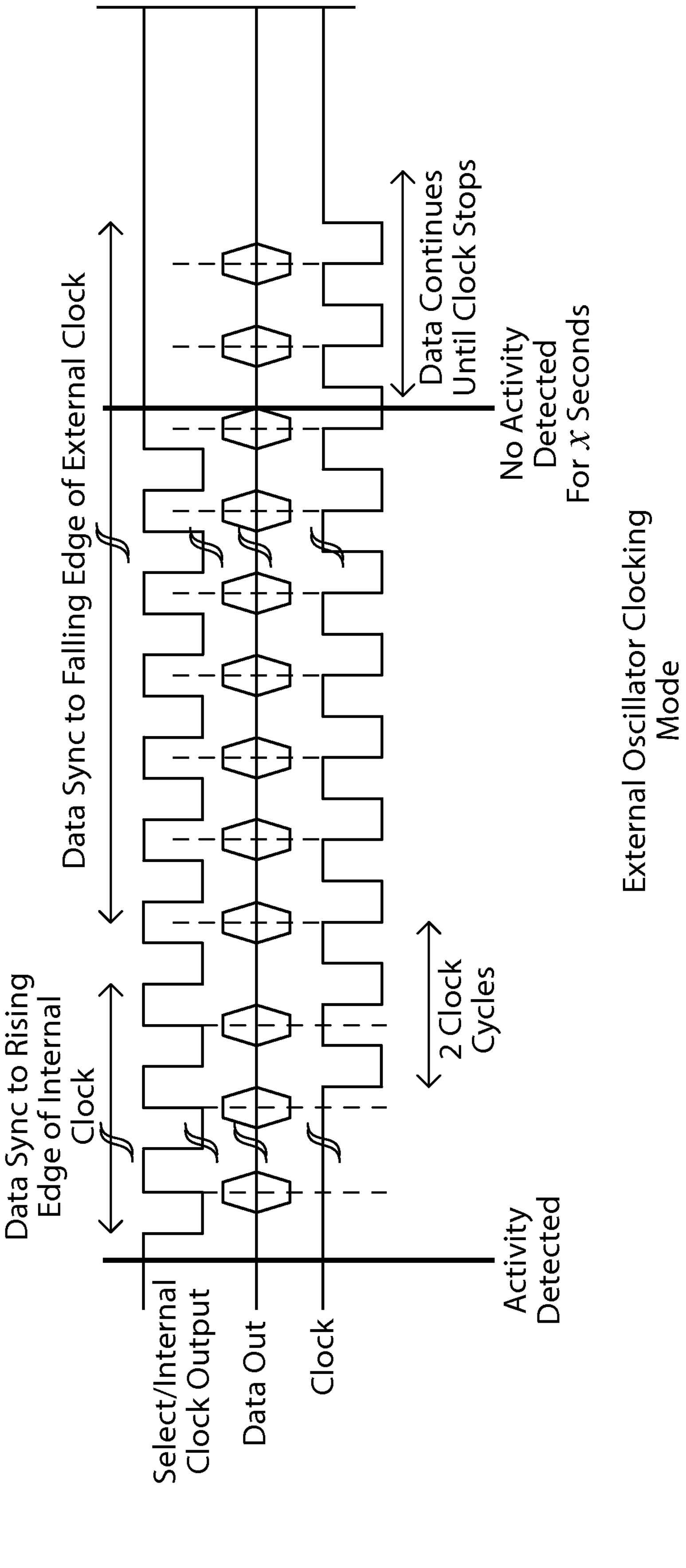
FIG. 3 comprises a timing diagram showing another aspect of the operation of the system of FIG. 1 according to various embodiments of the present invention.

This operation is shown in FIG. 3. The select pin (e.g., select pin 124) is the top line, the data pin (e.g., data pin 126) is the second line from the top, and the clock pin (e.g., clock pin 122) is the bottom line on the graph. It can be seen that once acoustic activity is detected, the data driven on the data pin (e.g., data pin 126) is synchronized with the external clock within two cycles, in one example. Other examples are possible. Data is synchronized on the falling edge of the external clock. Data can be synchronized using other clock edges as well. Further, the external clock is removed when activity is no longer detected for the microphone to return to lowest power mode.

Figure 4:
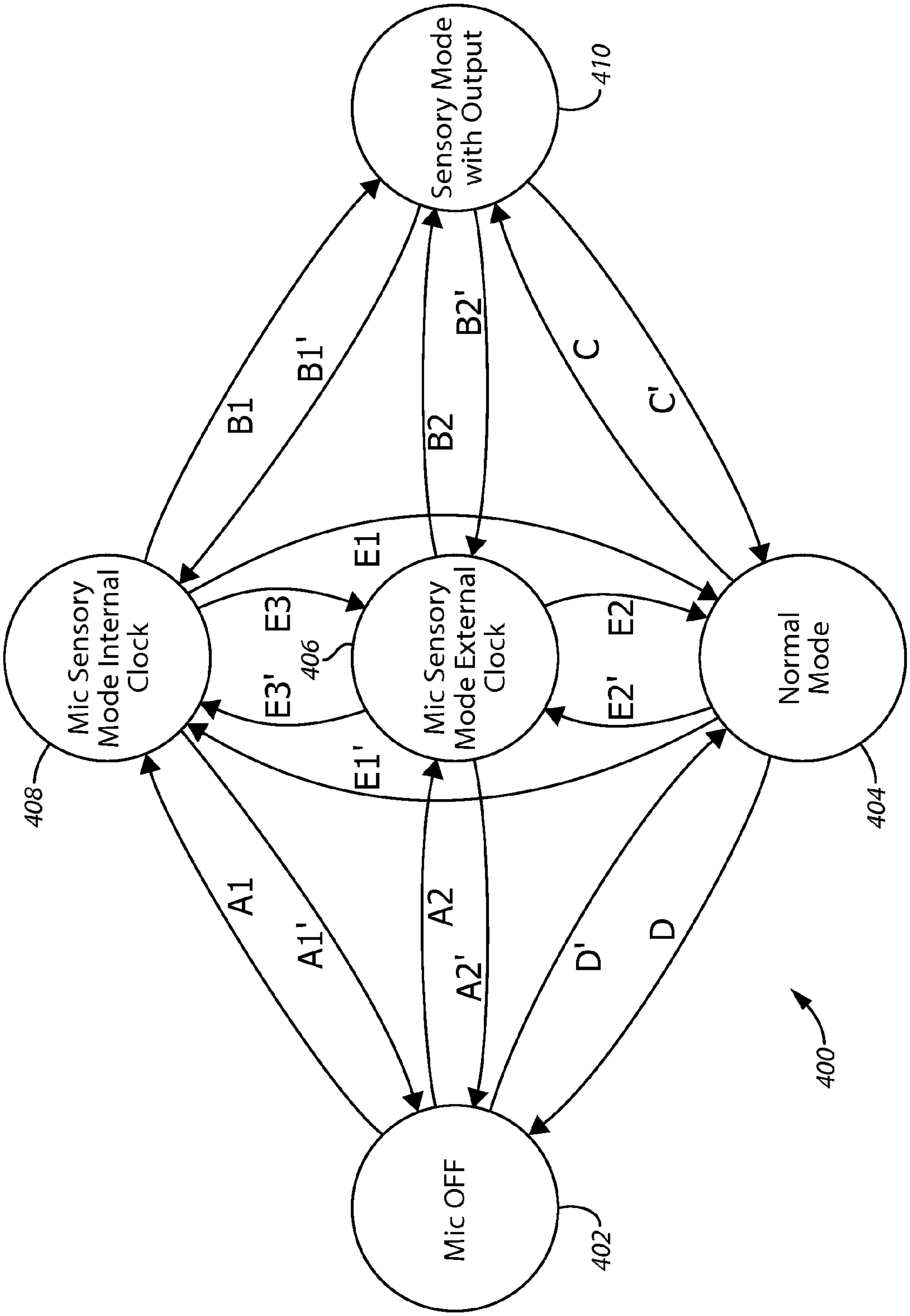
FIG. 4 comprises a state transition diagram showing states of operation of the system of FIG. 1 according to various embodiments of the present invention.

Referring now to FIGS. 4 and 5, a state transition diagram 400 (FIG. 4) and transition condition table 500 (FIG. 5) are described. The various transitions listed in FIG. 4 occur under the conditions listed in the table of FIG. 5. For instance, transition A1 occurs when Vdd is applied and no clock is present on the clock input pin. It will be understood that the table of FIG. 5 gives frequency values (which are approximate) and that other frequency values are possible. The term "OTP" means one time programming.

The state transition diagram of FIG. 4 includes a microphone off state 402, a normal mode state 404, a microphone sensing mode with external clock state 406, a microphone sensing mode internal clock state 408 and a sensing mode with output state 410.

Figure 2:
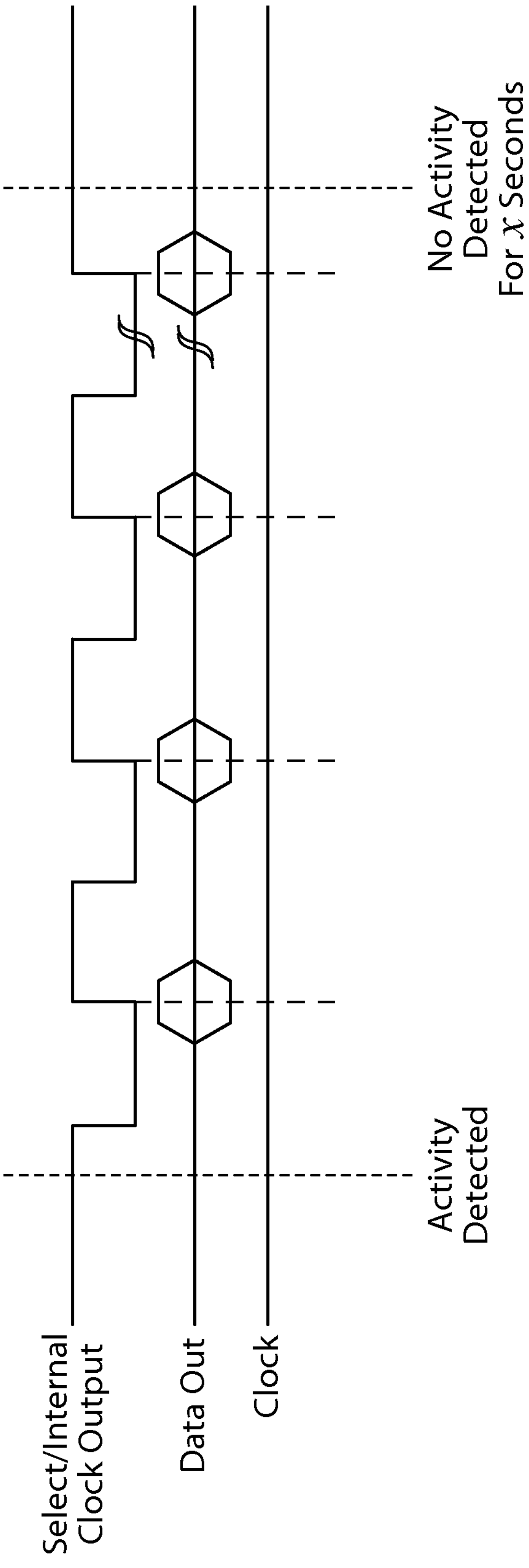
FIG. 2 comprises a timing diagram showing one aspect of the operation of the system of FIG. 1 according to various embodiments of the present invention.

The microphone off state 402 is where the microphone 400 is deactivated. The normal mode state 404 is the state during the normal operating mode when the external clock is being applied (where the external clock is within a predetermined range). The microphone sensing mode with external clock state 406 is when the mode is switching to the external clock as shown in FIG. 3. The microphone sensing mode internal clock state 408 is when no external clock is being used as shown in FIG. 2. The sensing mode with output state 410 is when no external clock is being used and where data is being output also as shown in FIG. 2.

As mentioned, transitions between these states are based on and triggered by events. To take one example, if the microphone is operating in normal operating state 404 (e.g., at a clock rate higher than 512 kHz) and the control module detects the clock pin is approximately 512 kHz, then control goes to the microphone sensing mode with external clock state 406. In the external clock state 406, when the control module then detects no clock on the clock pin, control goes to the microphone sensing mode internal clock state 408. When in the microphone sensing mode internal clock state 408, and an acoustic event is detected, control goes to the sensing mode with output state 410. When in the sensing mode with output state 410, a clock of greater than approximately 1 MHz may cause control to return to state 404. The clock may be less than 1 MHz (e.g., the same frequency as the internal oscillator) and is used synchronized data being output from the microphone to an external processor. No acoustic activity for an OTP programmed amount of time, on the other hand, causes control to return to state 406.

It will be appreciated that the other events specified in FIG. 5 will cause transitions between the states as shown in the state transition diagram of FIG. 4.

Preferred embodiments of this invention are described herein, including the best mode known to the inventors for carrying out the invention. It should be understood that the illustrated embodiments are exemplary only, and should not be taken as limiting the scope of the invention.

What is claimed is:

1. A method in a microphone, the method comprising:

producing analog signals using a microelectromechanical system (MEMS) transducer of the microphone;

converting the analog signals into digital data using an analog-to-digital convertor of the microphone;

determining whether acoustic activity exists within the digital data using a voice activity detector of the microphone;

upon the detection of acoustic activity, providing an indication of acoustic activity at an external-device interface of the microphone, the external-device interface standardized for compatibility with a plurality of devices from different manufacturers;

before detecting voice activity, operating the microphone in a first mode by clocking at least a portion of the microphone with an internal clock signal based on a local oscillator of the microphone while determining whether acoustic activity exists; and after detecting voice activity, operating the microphone in a second mode by providing output data, representing the analog signals, at the external-device interface, wherein the output data is not provided at the external-device interface in the first mode.

2. The method of claim 1, operating the microphone in the second mode includes synchronizing the output data with either the internal clock signal or an external clock signal received at the external-device interface.

3. The method of claim 1, receiving an external clock signal at the external-device interface in response to providing the indication of acoustic activity, wherein the output data is synchronized with the external clock signal when the external clock signal is present at the external-device interface.

4. The method of claim 3, transitioning the microphone from operating in the second mode to operating in the first mode after acoustic activity is no longer detected, wherein the first mode has lower power consumption than the second mode.

5. The method of claim 1, providing the indication of acoustic activity by providing the internal clock signal at the external-device interface, operating the microphone in the second mode includes synchronizing the output data with the internal clock signal, receiving an external clock signal at the external-device interface in response to providing the internal clock signal at the external-device interface, synchronizing the output data with the external clock signal after receiving the external clock signal.

6. The method of claim 1 further comprising buffering data representing the analog signal during voice activity detection, at least some of the output data based on the buffered data.

7. A microphone apparatus comprising:

a MEMS transducer configured to produce an analog signal in response to acoustic input;

an analog-to-digital converter coupled to the transducer and configured to convert the analog signal into digital data; and a voice activity detector configured to determine whether voice activity is present by performing voice activity detection on the digital data;

wherein the microphone apparatus is configured to operate in a first mode before voice activity is detected by performing voice activity detection using an internal clock signal generated from a local oscillator of the microphone apparatus; and wherein the microphone apparatus is configured to operate in a second mode after voice activity is detected by providing output data, representing the analog signal, on an external-device interface of the microphone apparatus, the external-device interface standardized for compatibility with devices from different manufacturers, the external-device interface of the microphone apparatus devoid of the output data in the first mode.

8. The apparatus of claim 7, the external-device interface including a clock connection, a select connection and a data connection, the clock connection configured to receive an external clock signal in response to providing a signal on the select connection after detecting voice activity, the output data provided on the data connection using the external clock signal after receiving the external clock signal.

9. The apparatus of claim 8, further configured to transition from operating in the second mode to operating in the first mode when the external clock signal is no longer received on the clock connection.

10. The apparatus of claim 7, further configured to provide the output data on the external-device interface of the microphone for a specified time after determining that voice activity is no longer present before discontinuing providing the output data on the external-device interface.

11. The apparatus of claim 7, further configured to buffer data representing the analog signal during voice activity detection, at least some of the output data obtained from the buffered data.

12. The apparatus of claim 7, the external-device interface including a data connection and a select connection, the microphone configured to provide the output data on the data connection and provide the internal clock signal on the select connection after voice activity is detected.

13. The apparatus of claim 12, further configured to receive an external clock signal on the external-device interface while providing the output data at the external-device interface using the internal clock signal, and synchronize the output data provided on the external-device interface with the external clock signal after receiving the external clock signal on the external-device interface.

14. A microphone apparatus comprising:

a MEMS transducer having an output and configured to produce an analog signal in response to acoustic input at the MEMS transducer;

an analog-to-digital converter coupled to the MEMS transducer output, the analog-to-digital converter configured to output digital data based on the analog signal from the MEMS transducer;

a voice activity detector coupled to the output of the analog-to-digital converter;

a controller having an input and an output, the input of the controller coupled to the output of the analog-to-digital converter, a local oscillator;

an external-device interface standardized for compatibility with devices from different manufacturers, the external-device interface coupled to the controller output, the microphone apparatus having a first mode of operation before voice activity is detected, at least a portion of the microphone clocked by an internal clock signal of the local oscillator during voice activity detection in the first mode of operation, the microphone apparatus having a second mode of operation after voice activity is detected, the controller output coupled to the external-device interface, wherein the controller is configured to provide output data, representing the analog signal, at the external-device interface during the second mode of operation but not during the first mode of operation.

15. The apparatus of claim 14, the external-device interface including a clock connection, a select connection and a data connection, the controller output coupled to the select connection after voice activity is detected wherein a signal on the controller output is provided on the select connection, in the second mode of operation, the controller output coupled to the data connection when the controller provides the output data on the data connection, and wherein the output data on the data connection is synchronized with an external clock signal on the clock connection.

16. The apparatus of claim 15, the controller output coupled to the select connection after voice activity is detected wherein a signal on the controller output is provided at the select connection and wherein the external clock signal is received on the clock connection in response to the signal on the select connection.

17. The apparatus of claim 15, the microphone transitioned from the second mode of operation to the first mode of operation when the external clock signal is removed from the clock connection.

18. The apparatus of claim 14, a buffer having an input and an output, the buffer input coupled to the output of the analog-to-digital converter, the buffer output coupled to the controller input, wherein data representing the analog signal is buffered in the buffer during voice activity detection, in the second mode, data based on the buffered data is provided at the external-device interface after voice activity is detected.

19. The apparatus of claim 14, the external-device interface including a data connection and a select connection, in the second mode, the controller output coupled to the data connection after voice activity is detected wherein the internal clock signal is provided on the select connection, and wherein the output data at the external-device interface is synchronized with the internal clock signal.

20. The apparatus of claim 19, the external-device interface including a clock connection, in the second mode, the output data on the data connection synchronized with an external clock signal provided on the clock connection in response to the signal on the select connection.

21. The apparatus of claim 20, synchronization of the output data with the internal clock signal transitioned to the external clock signal when the external clock signal is present on the clock connection.

22. The apparatus of claim 14, wherein the interface is compatible with at least one of a PDM protocol, an $I^2S$ protocol, or an $I^2C$ protocol.

* * * * *